(12) United States Patent  
Lewis (10) Patent No.: US 8,861,239 B2  
(45) Date of Patent: Oct. 14, 2014

(54) REGULATING OUTPUT CHARACTERISTICS OF STATIC ENERGY SUPPLY UNITS

(75) Inventor: Eric Anthony Lewis, Warwickshire (GB)

(73) Assignee: GE Energy Power Conversion Technology Limited, Rugby, Warwickshire (GB)

(*) Notice: Subject to any disclaimer, the term of this patent is extended or adjusted under 35 U.S.C. 154(b) by 0 days.

(21) Appl. No.: 13/346,770

(22) Filed: Jan. 10, 2012

(65) Prior Publication Data

US 2013/0039106 A1 Feb. 14, 2013

(30) Foreign Application Priority Data

Jan. 15, 2011 (EP) .................................. 11000293

(51) Int. Cl.
*H02M 7/537* (2006.01)
*H02J 3/28* (2006.01)
*H02J 3/32* (2006.01)
*H02M 7/538* (2007.01)

(52) U.S. Cl.
CPC .... *H02J 3/28* (2013.01); *H02J 3/32* (2013.01)
USPC .............................. 363/131; 363/165; 363/173

(58) Field of Classification Search
USPC ............ 363/35–37, 39–41, 43, 45, 55, 56.01, 363/131, 165, 173
See application file for complete search history.

(56) References Cited

U.S. PATENT DOCUMENTS

| | | | | |
|---|---|---|---|---|
| 4,377,780 A | * | 3/1983 | Bjorklund | 322/29 |
| 4,941,079 A | * | 7/1990 | Ooi | 363/132 |
| 5,182,463 A | * | 1/1993 | Yamamoto et al. | 307/46 |
| 5,469,045 A | * | 11/1995 | Dove et al. | 323/211 |
| 5,798,633 A | | 8/1998 | Larsen et al. | |
| 6,088,245 A | * | 7/2000 | Ainsworth | 363/39 |
| 7,402,983 B2 | * | 7/2008 | Jacobson et al. | 323/214 |
| 7,800,926 B2 | * | 9/2010 | Benaboud et al. | 363/43 |
| 8,116,108 B2 | * | 2/2012 | Becker et al. | 363/127 |
| 8,390,223 B2 | * | 3/2013 | Nakamura et al. | 318/400.01 |
| 8,446,742 B2 | * | 5/2013 | Hattori et al. | 363/16 |

(Continued)

OTHER PUBLICATIONS

Wijnbergen, S. et al., "A System for Dispersed Generator Participation in Voltage Control and Primary Frequency Control," Power Electronics Specialists Conference, 2005. PESC 2005. IEEE 36th, IEEE, Piscataway, NJ, Jan. 1, 2005, pp. 2918-2924.

(Continued)

*Primary Examiner* — Adolf Berhane
*Assistant Examiner* — Nusrat Quddus
(74) *Attorney, Agent, or Firm* — Parks IP Law LLC; Theodore A. Wood (57) ABSTRACT

A static energy supply unit has an energy store connected to an ac supply network by a power converter. A unit controller for the static energy supply unit includes an amplitude controller, a phase controller and a frequency controller. These measure and record characteristics of the supply network and provide output signals indicative of the voltage characteristics for an operating condition of the supply network. A signal generator for generating a simulated output voltage signal for each phase of the supply network is provided. A comparator is used to compare the simulated output voltage signal for each phase and a measured voltage for a corresponding phase of the supply network. The controller controls the operation of the power converter to vary the amount of power that is supplied to the supply network from the energy store based on the comparison of the simulated output voltage signal(s) and the measured voltage(s).

10 Claims, 3 Drawing Sheets

(56) References Cited

U.S. PATENT DOCUMENTS

| | | | |
|---|---|---|---|
| 2002/0039299 A1* | 4/2002 | Nishimura et al. | 363/39 |
| 2007/0223261 A1* | 9/2007 | Fujii et al. | 363/55 |
| 2008/0212343 A1 | 9/2008 | Lasseter et al. | |
| 2009/0161398 A1* | 6/2009 | Benaboud et al. | 363/131 |
| 2012/0212191 A1* | 8/2012 | Yuzurihara et al. | 323/205 |

OTHER PUBLICATIONS

Borup, Uffe et al., "A New Space-Vector-Based Control Method for UPS Systems Powering Nonlinear and Unbalanced Loads," IEEE Transactions on Industry Application, vol. 37, No. 6, Nov./Dec. 2001, pp. 1864-1870.

* cited by examiner

Figure 2

(a) AC voltages (b) Output power for load change - static energy store according to the present invention (c) Output power for load change - synchronous generator (d) Output power for load change - conventional static energy store Time in mains cycles

Figure 3

REGULATING OUTPUT CHARACTERISTICS OF STATIC ENERGY SUPPLY UNITS

FIELD OF THE INVENTION

The present invention relates to controllers for static energy supply units, typically of the sort that are used to supply ac power to an ac supply network or power grid. The units may be controlled rapidly, typically to reproduce the power response of an ac synchronous generator that is connected to the supply network.

BACKGROUND OF THE INVENTION

In a typical ac grid system a power generation unit may supply ac power to an ac supply network or power grid. The power generation unit is connected to the supply network by protective switchgear with circuit breakers and associated controls. Electrical loads are similarly connected to the supply network by protective switchgear.

The power generation unit may include a steam turbine apparatus where steam is generated and supplied to a turbine assembly. A shaft of the turbine assembly is connected to the rotor of an ac synchronous generator, either directly or by means of a gearbox. The ac frequency of the stator voltage that is developed at the stator terminals of the generator is directly proportional to the speed of rotation of the rotor. The ac frequency of the supply network is monitored and used to control the operation of the power generation unit to keep the frequency within acceptable limits, which will typically be determined by the grid codes. For example, a closed-loop amplifier can be used to compare the actual frequency of the supply network against a reference frequency (e.g. 50 Hz for Europe). If there is a reduction in the frequency of the supply network, perhaps caused by an increase in the amount of power that is being drawn by the connected electrical loads, then the power that is supplied by the generator can be increased by increasing the supply of steam to the turbine assembly or vice versa. Since the frequency of the supply network is directly linked to the shaft speed of the generator it is sometimes more convenient to use a measurement of shaft speed as an input to the closed-loop amplifier.

The power generation unit is designed to have a small change on the frequency of the supply network as the required ac load power is increased. This is done so that if several power generation units are connected to the supply network in parallel they can respond simultaneously to changes in the ac load power (parallel droop control). The power generation unit can also be controlled to respond to changes in power if one or more parallel power generation units are disconnected or connected to the supply network.

A similar control scheme can be used for different types of power generation unit to change the amount of power that is supplied to the generator, e.g. gas turbine apparatus or diesel generators.

When the ac synchronous generator has a low load then its electromotive force (emf) voltage vector will only have a very small (or even zero) phase shift compared to the ac voltage vector of the supply network. However, when the ac synchronous generator has a significant load then its emf voltage vector will have a significant phase shift compared to the ac voltage vector of the supply network. This is a fundamental action of the ac synchronous generator and it will be readily appreciated that the phase shift will increase proportionally with changes in load. If there is a sudden reduction in the frequency of the supply network then the phase shift will increase and the power supplied by the ac synchronous generator must increase. The increase in the supplied power will come initially from the rotating inertia of the ac synchronous generator using the inherent property of the ac synchronous generator that an increase in phase shift increases the supplied power. This inertia power reduces the rate of fall of the supply network frequency; however the frequency of the stator voltage will continue to fall until the generator controller has time to increase the supply of steam to the turbine by the action of its slower acting control system which measures the frequency of the ac supply network.

Figure 1:
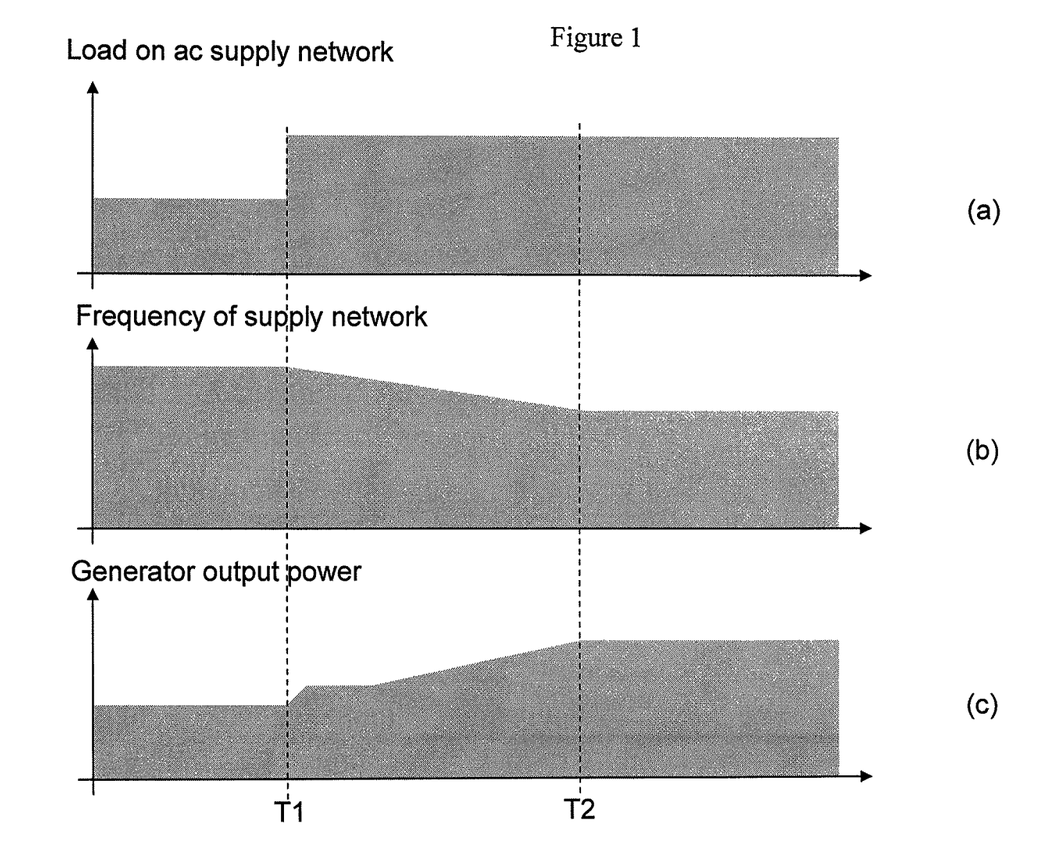
FIG. 1 shows the transient operation of an ac supply network.

The transient operation of the supply network is shown graphically in FIG. 1. Graph (a) shows the load on the supply network which increases suddenly at time T1. Graph (b) shows how the frequency of the supply network decreases steadily from time T1 until the additional steam is supplied to the turbine at time T2 to stabilise the supply network frequency at a lower level. Graph (c) shows how the ac synchronous generator responds rapidly at time T1 and increases output power in response to the increase in the phase shift that results from the sudden increase in the load on the supply network that is shown in graph (a). The energy for this rapid increase in output power initially comes from the rotating inertia of the generator by means of its inherent response to the phase change. After the rapid increase at time T1 the output power increases more slowly, due to the action of the generator control system measuring the decrease in the supply network frequency, until a steady-state operation is reached at time T2 with a higher output power but a lower supply network frequency. The system can then be controlled to return the frequency of the supply network to the desired frequency (e.g. 50 Hz). It can therefore be seen that the typical power response of an ac synchronous generator is the combination of a rapid but smaller initial inertia-based response followed by a slower but larger final response that is provided by the generator control system on the basis of a measurement of the supply network frequency. The ratio of the smaller initial inertia-based response to the slower but larger final response depends mainly on the rotating inertia of the generator versus the power rating of the generator. This is because the power of the inertia-based response is proportional to the generator speed, the rotating inertia of the generator and the rate of change of the supply network frequency. The magnitude of the inertia-based response is therefore defined by the physical design of the rotating parts of the generator and is not easily varied by control systems.

The ac synchronous generators support the supply network in different ways, during sudden load changes, depending on their operating conditions. For example, if a generator is on minimum output it can only respond to sudden increases in the load, while if a generator is on maximum output it can only respond to sudden decreases in the load. So for normal operating conditions generators effectively reduce the effect that such sudden load changes have on the supply network frequency as a result on their rotating inertia.

A static energy supply unit can also be connected to the supply network. The static energy supply unit may include an energy store of any suitable type (e.g. lithium batteries, supercapacitors, flywheels and flow cells) connected to the supply network by means of a power converter and associated systems. The power converter can be an inverter of any suitable topology (e.g. 2-level, 3-level or multi-level designs) having a plurality of semiconductor switching devices (e.g. IGBTs, IGCTs and IEGTs) operated according to a pulse width modulation (PWM) strategy. The frequency of the supply network is monitored by sensors and used to control the operation of the static energy supply unit. For example, a closed-loop amplifier can be used to compare the actual frequency of the supply network against a reference frequency (e.g. 50 Hz for Europe). If there is a reduction in the actual frequency of the supply network then the power that is supplied by the energy store can be increased or vice versa. The amount of power that is supplied to the supply network is determined by controlling the operation of the power converter, e.g. by varying the PWM strategy that is applied to open and close the semiconductor switching devices. The power response of the static energy supply unit to a sudden increase in load on the supply network is similar to the slower but larger final response of the control system for an ac synchronous generator of a power generation unit because of the need to measure a reduction in the frequency of the supply network. It therefore typically takes several cycles of the supply network before the power converter can be controlled in an appropriate manner to support the supply network.

Most large ac grid systems have a large number of power generation units with ac synchronous generators that can initially provide a rapid inertia-based response to support the supply network. However, it is likely that in the future a proportion of these power generation units will be replaced with renewable energy devices (e.g. wind turbines) that will require excess energy to be stored in energy stores. Accordingly there is a need for improved controllers for static energy supply units that can provide a power response which is capable of at least reproducing the power response of an ac synchronous generator and hence enable the static energy supply units to provide support to the supply network during sudden load changes.

SUMMARY OF THE INVENTION

The present invention provides a method of controlling the operation of a static energy supply unit having an energy store (e.g. lithium batteries, super-capacitors, flywheels and flow cells) connected to an ac supply network by a power converter, the method comprising the steps of measuring voltage characteristics of the ac supply network and providing voltage characteristic output signals indicative of the voltage characteristics for an operating condition of the ac supply network; generating a simulated output voltage signal for each phase of the ac supply network having voltage characteristics derived from the voltage characteristic output signals; comparing the simulated output voltage signal for each phase and a measured ac voltage for a corresponding phase of the ac supply network; and controlling the operation of the power converter to vary the amount of power that is supplied to the ac supply network from the energy store based on the comparison of the simulated output voltage signal(s) and the measured ac voltage(s).

The operating condition of the ac supply network can be the prevailing or current operating condition if the ac supply network is operating normally. However, if the ac supply network is not operating normally because it is experiencing a fault or transient, for example, the operating condition of the ac supply network can be a previous operating condition that existed before the fault occurred, i.e. when the supply network was operating normally.

The supply network may have any suitable number of phases.

The step of comparing the simulated output voltage signal(s) and the measured ac voltage(s) can be used to detect a phase shift. In this case the operation of the power converter can be controlled on the basis of any detected phase shift. Detecting phase shift allows the controller of the present invention to respond to a change in supply network load more rapidly than the control system of a conventional static energy supply unit or the control system of an ac synchronous machine which both rely on a measurement of supply network frequency.

The step of measuring voltage characteristics of the supply network can include measuring the amplitude, phase and frequency of the ac voltage(s) of the supply network. This can be done by suitable sensors associated with the supply network. The voltage characteristic output signals are typically indicative of the voltage characteristics for the prevailing or more recent normal operating condition of the ac supply network depending on the rate of the change of the amplitude, phase and frequency of the ac voltage(s).

A measured value of the amplitude of the supply network can be stored in an amplitude controller. The amplitude controller can provide an amplitude output signal having a value which is indicative of the amplitude of the ac voltage(s) of the supply network for the appropriate operating condition of the supply network. As mentioned above, it is preferred that an amplitude output signal can still be provided if the ac voltage(s) of the supply network are lost for any reason, e.g. as a result of a fault or transient. In this case a stored value of the measured amplitude can be used from a previous operating condition when the supply network was operating normally. The value of the amplitude output signal can vary with the amplitude of the ac voltage(s) of the supply network but with a settable time constant delay.

A measured value of the phase of the supply network can be stored in a phase controller. The phase controller can provide a phase output signal having a value which is indicative of the phase of the ac voltage(s) of the supply network for the appropriate operating condition of the ac supply network. It is preferred that a phase output signal can still be provided if the ac voltage(s) of the supply network are lost for any reason, e.g. as a result of a fault or transient. In this case a stored value of the measured phase can be used from a previous operating condition when the supply network was operating normally. The value of the phase output signal can vary with the phase of the ac voltage(s) of the ac supply network but with a settable time constant delay.

A measured value of the frequency of the ac supply network can be stored in a frequency controller. The frequency controller can provide a frequency output signal having a value which is indicative of the frequency of the ac voltage(s) of the supply network for the appropriate operating condition of the supply network. It is preferred that a frequency output signal can still be provided if the ac voltage(s) of the supply network are lost for any reason, e.g. as a result of a fault or transient. In this case a stored value of the measured frequency can be used from a previous operating condition when the supply network was operating normally. The value of the frequency output signal can vary with the frequency of the ac voltage(s) of the supply network but with a settable time constant delay.

The time constant delays for the amplitude, phase and frequency output signals can be set depending on the results to be achieved by the control method. The amplitude, phase and frequency controllers can be adapted to change their outputs at a respective pre-set rate.

The value of the frequency output signal can be selectively varied such that the frequency of the simulated output voltage signal for each phase of the supply network gradually decreases at a given rate due to a pre-set response of the frequency controller.

Figure 3:
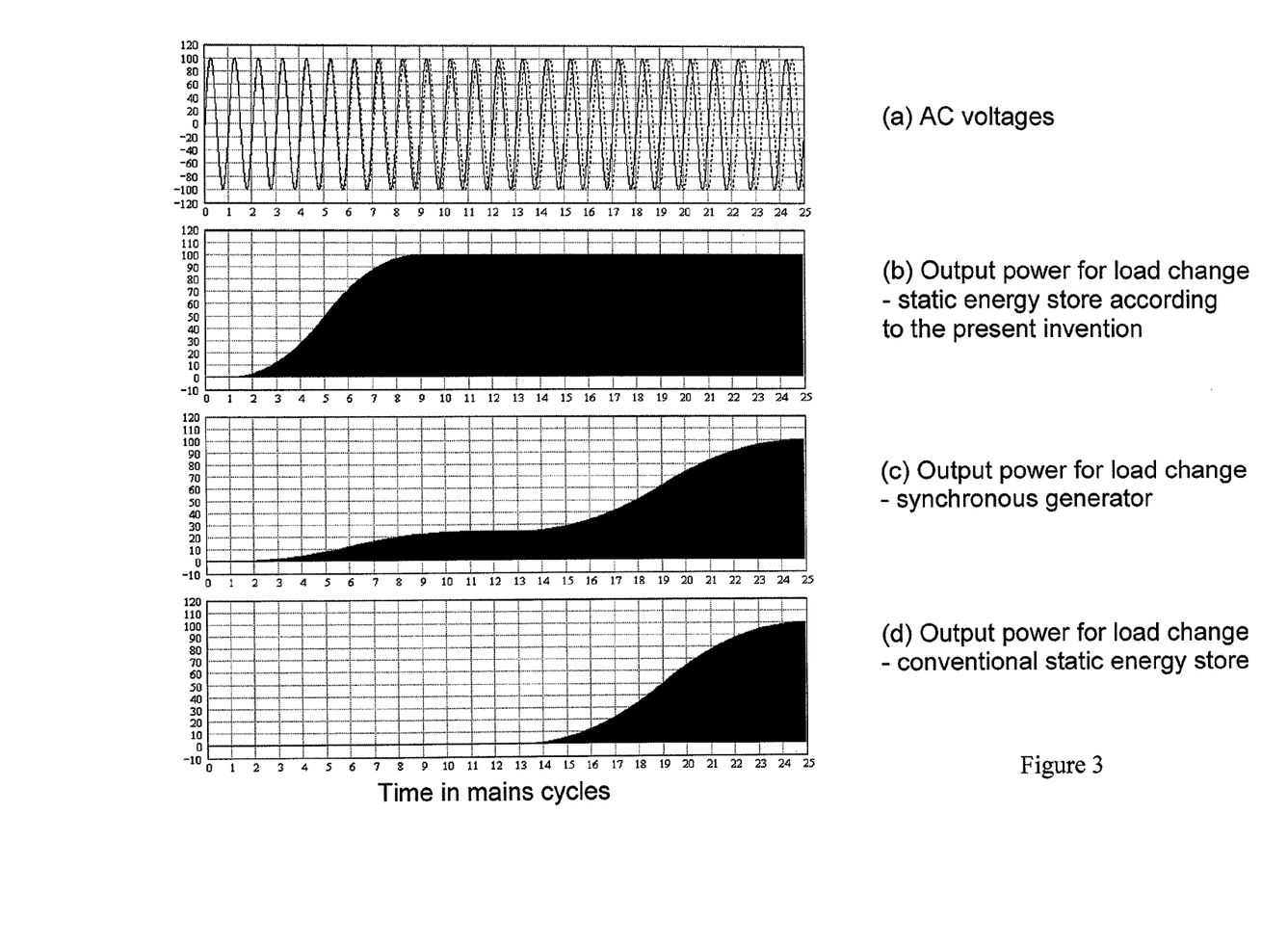
FIG. 3 shows various power responses that illustrate the technical advantages of the unit controller of FIG. 2.

The power converter can be controlled to vary the amount of power that is supplied to the supply network from the energy store in such a way as to substantially reproduce the power response of an ac synchronous machine connected to the supply network (e.g. to have a power response similar to that shown in graph (c) of FIG. 3 that substantially reproduces or simulates the initial inertia-based response and the final response of the ac synchronous machine). This can be achieved by setting the time constant parameters of the amplitude, phase and frequency controllers and the gains of any associated net difference signals. In practice different power responses are possible. For example, a power response can be set anywhere between that shown in graph (c) of FIG. 3 and that shown in graph (b) of FIG. 3 where the initial inertia-based response is 100% of the total response and the frequency based response is 0% of the total response. A workable control method and associated controller for the static energy supply unit would normally be set up to provide optimal benefits to the ac supply network.

The magnitude of any reproduced inertia-based response of the static energy supply unit can be determined with reference to the comparison of the simulated output voltage signal(s) and the measured ac voltage(s). The magnitude of any reproduced inertia-based response will preferably be locked to the changing supply network frequency by the controller and will not trip even for fast rates of fall of supply network frequency. Once the frequency of the simulated output voltage signal(s), as determined by the frequency controller, has become substantially aligned with the measured frequency of the supply network then any reproduced inertia-based response will preferably cease so the settable time constant delay for the frequency output signal is typically used to set how long the initial response will last. The settable time constant delays for the amplitude and phase output signals are typically less critical and will often be set to a longer time to be ready for the next frequency change event.

During steady-state operating conditions of the supply network no power is preferably supplied to the supply network from the energy store for the purpose of proving inertia support to the ac supply network. Of course power may flow through the power converter for other reasons that are not related to inertia support such as the normal charging and discharging of the energy store, for example.

The present invention further provides a controller for implementing the method described above.

The present invention further provides a controller for a static energy supply unit having an energy store connected to an ac supply network by a power converter, the controller comprising: an amplitude controller for measuring and optionally storing the amplitude of the ac voltage(s) of the ac supply network and providing an amplitude output signal having a value which is indicative of the amplitude of the ac voltage(s) of the ac supply network for an operating condition of the ac supply network; a phase controller for measuring and optionally storing the phase of the ac voltage(s) of the ac supply network and providing a phase output signal having a value which is indicative of the phase of the ac voltage(s) of the ac supply network for the operating condition of the ac supply network; a frequency controller for measuring and optionally storing the frequency of the ac voltage(s) of the ac supply network and providing a frequency output signal having a value which is indicative of the frequency of the ac voltage(s) of the ac supply network for the operating condition of the ac supply network; a signal generator (e.g. a fully-controllable source implemented in a microprocessor control system) for generating a simulated output voltage signal for each phase of the ac supply network, the simulated output voltage signal(s) having amplitude, phase and frequency characteristics derived from the amplitude, phase and frequency output signals, respectively; a comparator for comparing the simulated output voltage signal for each phase and a measured ac voltage for a corresponding phase of the ac supply network; and wherein the controller controls the operation of the power converter to vary the amount of power that is supplied to the ac supply network from the energy store based on the comparison of the simulated output voltage signal(s) and the measured ac voltage(s).

The controller can further comprise an inertia simulation function block for selectively varying the value of the frequency output signal before it is provided to the signal generator such that the frequency of the simulated output voltage signal for each phase of the ac supply network gradually decreases at a given rate. The inertia simulation function block can be used to simulate the rotary inertias of a total ac grid system which can set the real rate of change of frequency versus load changes in the ac supply network. The function of the inertia simulation function block is therefore to achieve the same response from the energy store system.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 2:
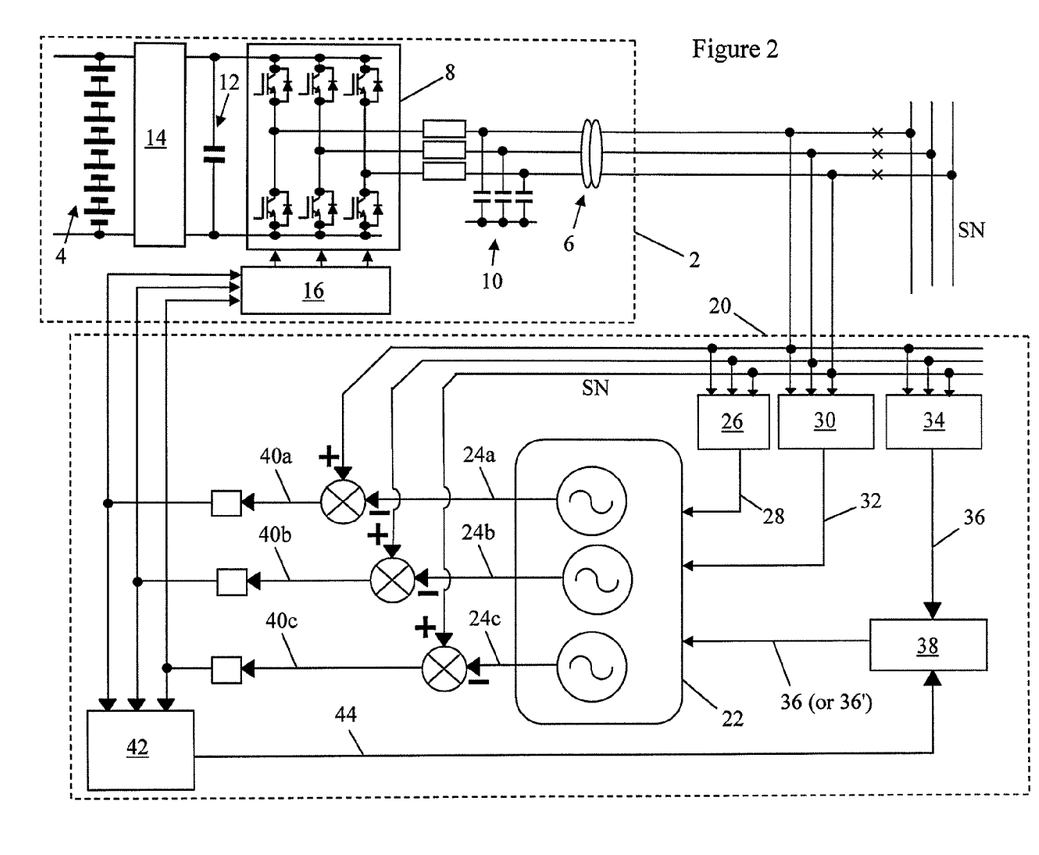
FIG. 2 shows a unit controller according to the present invention for controlling a static energy supply unit.

With reference to FIG. 2 a static energy supply unit 2 includes a dc energy store 4 that is connected to an ac supply network SN. An output transformer 6 has its primary windings connected to the supply network SN and its secondary windings connected to an inverter 8 where the IGBTs are controlled to open and close according to a pulse width modulation (PWM) strategy. A harmonic filter 10 is connected between the output transformer 6 and the inverter 8 and minimises harmonics caused by the normal operation of the inverter. The inverter 8 is connected to the dc energy store 4 by means of a dc link 12 and an optional dc/dc converter 14.

The gate command signals for opening and closing the IGBTs of the inverter 8 are derived by a current controller 16 that controls the amount of power that the static energy supply unit 2 supplies to the supply network SN through the inverter. In the conventional static energy supply unit described above, the current controller would control the inverter based on a comparison of the actual frequency of the supply network and a reference frequency (e.g. 50 Hz). In the case of the static energy supply unit 2 shown in FIG. 2 the current controller 16 controls the inverter 8 based on output signals provided by a unit controller 20.

The unit controller 20 for the static energy supply unit 2 includes a fully-controllable three-phase source 22 implemented as software signals in a microprocessor control system such as the power electronics controller (PECe) supplied by the present applicant. The output signals 24a-24c of the fully-controllable source 22 are output voltages that aim to simulate the internal voltages of an ac synchronous generator that has rotating inertia. The output signal for each phase as a function of the time variable t that is generated within the microprocessor control system as a continuously updating numeric value may be expressed as:

$$\text{Output\_A}(t) = A \cdot \sin(2\pi f t + \theta) \quad \text{(EQ1)}$$

$$\text{Output\_B}(t) = A \cdot \sin\left(2\pi f t + \theta + \frac{2\pi}{3}\right) \quad \text{(EQ2)}$$

$$\text{Output\_C}(t) = A \cdot \sin\left(2\pi f t + \theta + \frac{4\pi}{3}\right) \quad \text{(EQ3)}$$

where:
Output_A is the simulated output voltage for phase A (i.e. output signal 24a),
Output_B is the simulated output voltage for phase B (i.e. output signal 24b),
Output_C is the simulated output voltage for phase C (i.e. output signal 24c),
A is the voltage magnitude,
f is the voltage frequency, and
θ is the voltage phase angle.

The fully-controllable source will provide an output signal for each phase of the supply network and it will be readily appreciated that while the example shown in FIG. 2 includes a three-phase supply network any convenient number of phases may be used in practice.

Unlike an ac synchronous generator, the static energy supply unit 2 has no rotating inertia so its ac output voltages (i.e. the ac voltages supplied to the supply network through the inverter 8) are locked to the frequency of the supply network SN. By comparing the simulated output voltages provided by the fully-controllable source 22 with the ac voltages of the supply network then any detected phase shift can be used to control the amount of power that is provided to the supply network by the static energy supply unit 2, preferably in such a manner that the static energy supply unit supports the supply network in the same way as an ac synchronous generator.

The voltage magnitude A is determined by means of an amplitude controller 26. The amplitude controller 26 measures and stores the amplitude of the ac voltages of the supply network SN and provides an output signal 28 having a value which is indicative of the amplitude for the prevailing or most recent normal operating condition. The value of the output signal 28 will vary with the amplitude of the ac voltages of the supply network but with a settable time constant delay, typically one second. The time constant delay is designed to simulate the action of the internal emf voltages of an ac synchronous generator that do not vary particularly rapidly.

If the ac voltages of the supply network SN are lost for any reason (e.g. during a fault condition of the supply network) then the output signal 28 will continue to be provided at a value which represents the most recent operating condition before the ac voltages were lost. The aim is for the output signal 28 provided by the amplitude controller 26 to reproduce the amplitude of the emf voltage vector of an ac synchronous generator for all operating conditions of the supply network, including those where there is a fault.

The output signal 28 of the amplitude controller 26 is provided directly to the fully-controllable source 22 to control the amplitude of the output voltages as shown in equations EQ1-EQ3. If the output signal 28 increases then the amplitude of the output signals 24a-24c provided by the fully-controllable source 22 will increase or vice versa. The amplitude of the output signals 24a-24c provided by the fully-controllable source 22 is therefore varied in response to the measured amplitude of the ac voltages of the supply network SN but with a time response defined by the parameters of the amplitude controller 26.

The voltage phase θ is determined by means of a phase controller 30. The phase controller 30 measures and stores the phase of the ac voltages of the supply network SN and provides an output signal 32 having a value which is indicative of the phase for the prevailing or most recent normal operating condition. The value of the output signal 32 will vary with the phase of the ac voltages of the supply network but with a settable time constant delay, typically four seconds. The time constant delay is designed to slowly adapt to changes in the phase of the ac voltages.

If the ac voltages of the supply network SN are lost for any reason (e.g. during a fault condition of the supply network) then the output signal 32 will continue to be provided at a value which represents the most recent operating condition before the ac voltages were lost. The aim is for the output signal 32 provided by the phase controller 30 to reproduce the phase of the emf voltage vector of an ac synchronous generator for all operating conditions of the supply network.

The output signal 32 of the phase controller 30 is provided directly to the fully-controllable source 22 to control the phase of the output voltages as shown in equations EQ1-EQ3. If the output signal 32 increases then the phase of the output signals 24a-24c provided by the fully-controllable source 22 will increase or vice versa. The phase of the output signals 24a-24c provided by the fully-controllable source 22 is therefore varied in response to the measured amplitude of the ac voltages of the supply network SN but with a time response determined by the parameters of the phase controller 30.

The voltage frequency f is determined by means of a frequency controller 34. The frequency controller 34 measures and stores the frequency of the ac voltages of the supply network SN and provides an output signal 36 having a value which is indicative of the frequency for the prevailing or most recent normal operating condition. The value of the output signal 36 will vary with the frequency of the ac voltages of the supply network but with a settable time constant delay, typically four seconds. The time constant delay is designed to slowly adapt to changes in the frequency of the ac voltages.

If the ac voltages of the supply network SN are lost for any reason (e.g. during a fault condition of the supply network) then the output signal 36 will continue to be provided at a value which represents the most recent operating condition before the ac voltages were lost. The aim is for the output signal 36 provided by the frequency controller 34 to reproduce the frequency of the emf voltage vector of an ac synchronous generator for all operating conditions of the supply network.

The output signal 36 of the frequency controller 34 is provided to an inertia simulation function block 38. If the supply network SN is operating normally (i.e. within acceptable limits set by the grid codes) the output signal 36 of the frequency controller 34 is not varied by the inertia simulation function block 38 and is therefore provided, unchanged, to the fully-controllable source 22 to control the frequency of the output voltages as shown in equations EQ1-EQ3. If the output signal 36 increases then the frequency of the output signals 24a-24c provided by the fully-controllable source 22 will increase or vice versa. The frequency of the output signals 24a-24c provided by the fully-controllable source 22 is therefore varied in response to the measured frequency of the ac voltages of the supply network SN but with a time response determined by the parameters of the frequency controller 34.

The output signal 24a for phase A is subtracted from an actual ac voltage for phase A to derive a first net difference signal 40a. The first net difference signal 40a is scaled to give the required ac current for phase A which is then provided to the current controller 16 and used to control the amount of power that the static energy supply unit 2 provides to phase A of the supply network SN. Similarly, the output signals 24b and 24c for phases B and C are subtracted from actual ac voltages for phases B and C to derive second and third net difference signals 40b and 40c, respectively. The second and third net difference signals 40b and 40c are scaled to give the required ac currents for phases B and C which are then provided to the current controller 16.

In steady-state conditions when the ac voltages of the supply network SN are not changing then the output signals 24a-24c will have precisely the same amplitude, phase and frequency as the measured ac voltages. As a result the net difference signals 40a-40c that the unit controller 20 supplies to the current controller 16 will be zero and the static energy supply unit 2 will not supply power to the supply network for the purpose of providing inertia support. However, it will be readily appreciated that other control equations can be used to enable to dc energy store 4 to be charged and discharged to meet other operational requirements.

The power that is supplied to the supply network SN by the static energy supply unit 2 depends on the phase difference between the output signals 24a-24c provided by the fully-controllable source 22 and the actual ac voltage for the respective phase of the supply network. In the event that there is a change in the phase of the ac voltages in the supply network (e.g. because of a change in the load) then this will result in a change in the net difference signals 40a-40c. The current controller 16 will respond immediately to the detected phase change between the output signals 24a-24c and the actual ac voltages and the inverter 8 is controlled such that the static energy supply unit 2 will supply power to the supply network to support the support network to try and minimise any further change to the supply network frequency. The static energy supply unit 2 will typically appear to reproduce the power response of an ac synchronous generator but other power responses are possible. The static energy supply unit 2 is therefore capable of responding more rapidly than a conventional static energy supply unit described above which relies on detecting a change in the frequency of the supply network.

In an optional arrangement the inertia simulation function block 38 can cause the frequency of the output signals 24a-24c to decrease at a given rate whenever the static energy supply unit 2 is providing power to the supply network SN for inertia support. The purpose of the inertia simulation function block 38 is to allow the output signals 24a-24c to more accurately reproduce the rotational inertia of an ac synchronous generator which lets its rotational speed and stator frequency fall at a given rate. In this case a function block 42 converts the scaled net difference signals 40a-40c to a dc signal 44 that is equivalent to the power that is being provided by the static energy supply unit 2. The dc signal 44 is provided to the inertia simulation function block 38 to modify or change the output signal 36 from the frequency controller 34. The modified version of the output signal 36' is then provided to the fully-controllable source 22 to control the frequency of the output voltages as shown in equations EQ1-EQ3. However, in this case the frequency of the output signals 24a-24c is made to decrease at a given rate so that the overall power response of the static energy supply unit 2 more closely reproduces the power response of an ac synchronous generator.

The operation of the static energy supply unit 2 will now be further described with reference to FIG. 3.

Graph (a) shows how the ac voltage of phase A of the supply network (dotted line) and the simulated voltage for phase A that is represented by the output signal 24a of the fully-controllable source 22 (solid line) vary with time for an increase in the load in the supply network if no control actions are taken. For an increase in the supply network load the frequency of the supply network will decrease so the dotted line that represents the ac voltage of phase A of the supply network decreases relative to the solid line that represents the output signal 24a of the fully-controllable source 22 and which remains constant if no control actions are taken by the static energy supply unit 2. It will be readily appreciated that corresponding graphs could be provided for the ac voltages of phases B and C of the supply network and the corresponding output signals 24b and 24c of the fully-controllable source 22.

In practice, when a load is applied to the supply network SN, the frequency of the ac voltage for phase A of the supply network (dotted line) decreases which results in a phase shift when compared to the output signal 24a of the fully-controllable source 22 (solid line). The increase in phase shift that results from the reduction in the supply network frequency causes the generated output power of the static energy supply unit 2 to rapidly increase as shown in Graph (b). In other words, graph (b) shows the power response of the static energy supply unit 2 as a result of control actions.

Graph (c) shows the typical power response of an ac synchronous generator when a load is applied to the supply network with a rapid but small initial inertia-based response followed by a slower but larger final response that is provided by the generator control system on the basis of a measurement of the supply network frequency. It can be seen that Graph (c) corresponds to the time just after T1 in FIG. 1.

With the correct settings the power response of the static energy supply unit 2 (graph (b)) can be faster than the power response of an ac synchronous generator having a conventional frequency-based control system (graph (c)). Also, the magnitude of the response can be higher, up to the full rating of the dc energy store 4. This is possible as the static energy supply unit 2 is responding to a change in phase not supply network frequency. In practice, the power response of the static energy supply unit 2 can be anywhere between that shown in graph (b) and that shown in graph (c), in the latter case the power response will be set to reproduce the typical power response of an ac synchronous generator with an initial response that reproduces or simulates the initial inertia-based response of the generator. The power response of the static energy supply unit 2 will depend on the magnitude of the initial inertia-based response to the slower frequency-based response.

By way of comparison, graph (d) shows the power response of a conventional static energy supply unit 2 which does not have the initial inertia-based response of an ac synchronous generator and which relies on a measurement of supply network frequency to match the subsequent larger but slower response.

What is claimed is:

1. A method of controlling the operation of a static energy supply unit connected to an ac supply network by a power converter, the ac network being configured to receive power from a power generation unit, the method comprising:
measuring voltage characteristics of the ac supply network and providing voltage characteristic output signals indicative of the voltage characteristics during an operating condition of the ac supply network, the measuring including measuring a frequency of an ac voltage of the ac supply network;
generating a simulated output voltage signal for each phase of the ac supply network having voltage characteristics responsive to the output signals;

wherein each simulated output voltage signal is adjusted to represent a rotational inertia of the power generation unit when the frequency measurement is indicative of a decrease in the frequency;

comparing the simulated output voltage signal for each phase and a measured ac voltage for a corresponding phase of the ac supply network; and controlling (i) operation of the power converter to vary an amount of power supplied to the ac supply network from the energy store based on the comparing.

2. The method of claim 1, wherein the comparing the simulated output voltage signal and a measured ac voltage is used to detect a phase shift and wherein the operation of the power converter is controlled on the basis of any detected phase shift.

3. The method of claim 1, wherein the measuring voltage characteristics of the ac supply network further includes measuring the amplitude and phase of the ac voltage(s) of the ac supply network.

4. The method of claim 3, wherein a measured value of the amplitude of the ac supply network is stored in an amplitude controller and wherein the amplitude controller provides an amplitude output signal having a value which is indicative of the amplitude of the ac voltage(s) of the ac supply network for an operating condition of the ac supply network.

5. The method of claim 4, wherein the value of the amplitude output signal varies with the amplitude of the ac voltage(s) of the ac supply network but with a settable time constant delay.

6. The method of claim 3, wherein a measured value of the phase of the ac supply network is stored in a phase controller and wherein the phase controller provides a phase output signal having a value which is indicative of the phase of the ac voltage(s) of the ac supply network for an operating condition of the ac supply network.

7. The method of claim 6, wherein the value of the phase output signal varies with the phase of the ac voltage(s) of the ac supply network but with a settable time constant delay.

8. The method of claim 1, wherein the power converter is controlled to vary the amount of power that is supplied to the ac supply network from the energy store to substantially reproduce the power response of an ac synchronous machine connected to the ac supply network.

9. The method of claim 1, wherein during steady-state operating conditions of the ac supply network no power is supplied to the ac supply network from the energy store for the purpose of proving inertia support to the ac supply network.

10. A controller for a static energy supply unit having an energy store connected to an ac supply network by a power converter, the ac network being configured to receive power from a power generation unit, the controller comprising:

an amplitude controller for measuring and optionally storing the amplitude of the ac voltage(s) of the ac supply network and providing an amplitude output signal having a value which is indicative of the amplitude of the ac voltage(s) of the ac supply network for an operating condition of the ac supply network;

a phase controller for measuring and optionally storing the phase of the ac voltage(s) of the ac supply network and providing a phase output signal having a value which is indicative of the phase of the ac voltage(s) of the ac supply network for the operating condition of the ac supply network;

a frequency controller for measuring the frequency of the ac voltage(s) of the ac supply network and providing a frequency output signal having a value which is indicative of the frequency of the ac voltage(s) of the ac supply network for the operating condition of the ac supply network;

wherein the frequency output signal is adjusted to represent a rotational inertia of the power generation unit when the frequency measurement is indicative of a decrease in the frequency;

a signal generator for generating a simulated output voltage signal for each phase of the ac supply network, the simulated output voltage signal(s) having amplitude, phase and frequency characteristics derived from the amplitude, phase and frequency output signals, respectively; and a comparator for comparing the simulated output voltage signal for each phase and a measured ac voltage for a corresponding phase of the ac supply network; and wherein the controller controls the operation of the power converter to vary the amount of power that is supplied to the ac supply network from the energy store based on the comparison of the simulated output voltage signal(s) and the measured ac voltage(s).

* * * * *